Jan. 18, 1927.  W. SWINDOWSKY  1,614,699
SHOCK ABSORBER
Filed Feb. 23, 1921
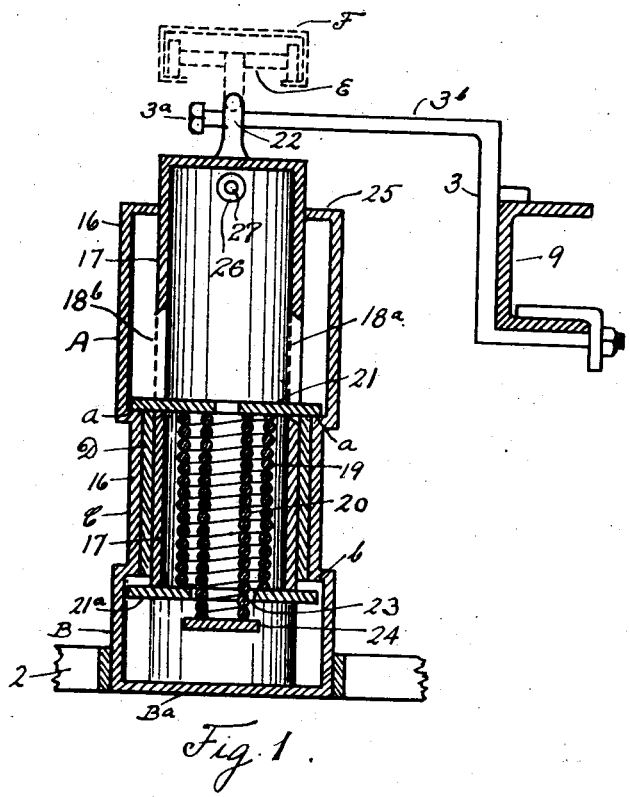
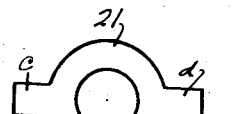
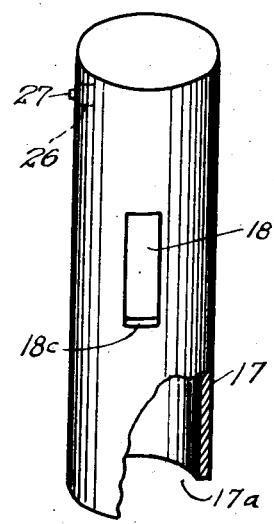
INVENTOR.
Walter Swindowsky Patented Jan. 18, 1927.

1,614,699

UNITED STATES PATENT OFFICE.

WALTER SWINDOWSKY, OF SAN ANTONIO, TEXAS.

SHOCK ABSORBER.

Application filed February 23, 1921. Serial No. 447,072.

This invention relates to new and useful improvements in shock absorbers.

One object of the invention is to provide a shock absorber designed to be interposed between the chassis and axle of a motor vehicle, and including suitable coil springs, or similar yieldable members, so disposed as to partly, or entirely absorb the shocks incident to the passage of the vehicle over rough roads.

With the above and other objects in view this invention has particular relation to certain novel features of construction, operation and arrangement of parts, an example of which is given in this specification and illustrated in the accompanying drawings, wherein:—

Figure 1 shows a vertical sectional view of the device shown in its relation to the vehicle and chassis.

Figure 2 shows a fragmentary perspective view of a sleeve employed, and

Figure 3 shows a plan view of a thrust plate employed.

Referring now more particularly to the drawings, wherein like numerals of reference designate similar parts in each of the figures, the numeral 2 designates a vehicle axle. The numeral 3 designates a connecting bracket which is secured at one end to the adjacent side member 9, of the chassis. Mounted on the axle there is a tubular housing 16. The midportion of the housing is contracted, forming the spaced inside, annular shoulders, $a$ and $b$. The bottom end of the housing is closed and the top thereof is open but provided with an annular inwardly extending flange 25.

Within the housing there is a movably mounted sleeve 17 whose upper end works through the flange 25 and the lower end of which is surrounded by the lining D, mounted in the contracted portion of the housing, between the internal shoulders thereof.

The upper end of the sleeve 17 has an eye 22 through which the outwardly turned end $3^b$, of the bracket 3, extends, and a nut $3^a$ is threaded onto said outwardly turned end to prevent its detachment from said eye.

The sleeve 17 has opposing slots 18, 18, intermediate the ends thereof. Within this sleeve there is a strong coil spring 19, designated as the primary spring, and within it an auxiliary coil spring 20. There is a circular thrust plate 21, within the sleeve 17, above said springs, said plate having opposing extensions $c$ and $d$ which work through the respective slots 18 and project over the shoulder $a$. The upper ends of the springs 19 and 20 are secured to this thrust plate, which also has a central opening 23. There is a bottom thrust plate $21^a$ to which the lower end of the spring 19 is secured and which fits closely within the lower end of the housing 16 and is adapted to receive the downward thrust of the sleeve 17, whose margin is adapted to seat on the annular shoulder $b$. This thrust plate $21^a$ has a central aperture 23 through which the lower end of the auxiliary spring 20 works, and attached to said lower end there is a disc-like stop 24 of greater diameter than the diameter of the aperture $23^a$.

The upper end of the sleeve 17 has an oil inlet opening 26, through which the housing may be filled with oil for lubricating purposes, and this opening is normally closed with the plug 27.

The operation of the device is as follows:—

On the downward movement of the chassis the sleeve 17 is thrust downwardly by the bracket arm $3^b$ forcing the thrust plate $21^a$ downwardly and expanding the spring 19 until the plate $21^a$ contacts against the stop 24; a further downward movement of the chassis will now result in the expansion of the auxiliary spring 20, also. The downward movement of the chassis is thereby retarded or checked. The housing being filled with oil, upon the downward movement of the plate $21^a$ the oil beneath will be partly compressed and forced up through the central aperture thereof, thus assisting in absorbing the shock.

Upon rebound the sleeve 17 is forced upwardly and contacts with the extensions $c$ and $d$ thus lifting the thrust plate 21 and seating the plate $21^a$ against the shoulder $b$ and thereafter placing the spring 19 under tension. When the stop 24 seats against the plate $21^a$ and upon further upward movement of the chassis the spring 20 is also placed under tension, thus gradually checking, or absorbing the rebound. Here also the lubricant filling the housing assists in checking the rebound.

What I claim is:—

1. A device of the character described including an outer housing having the upper and lower ends of a diameter greater than the intermediate section; forming spaced shoulders, an inner sleeve having opposing slots and movably mounted in the outer housing, a primary coil spring of an extension type in the sleeve, a thrust plate to which the upper end of said spring is secured, said plate being movably positioned in said sleeve, another thrust plate having a central opening and secured to the lower end of said spring and adapted to bear against the other shoulder of said housing; a secondary coil spring of a length greater than said first mentioned spring, mounted in said primary spring, the top end of the secondary spring being secured to the top thrust plate and the bottom end adapted to pass through said opening in the lower thrust plate a stop secured to the protruding end of said secondary spring and having a diameter larger than the diameter of said opening, projections on the upper thrust plate extending through the slots of said sleeve and adapted to seat on the upper shoulder, the bottom end of said sleeve being adapted to bear on the other thrust plate, and means to attach the housing to one element of a vehicle and means to secure the sleeve to another element of the vehicle movable with respect to the first mentioned element.

2. In a shock absorbing device, a housing closed at one end, having an inwardly extending flange on the other end, an inner element movably positioned in said housing, a coil spring in the housing thrust plates to which the ends of the spring are secured one plate having an opening, spaced supports in said housing against which the plates seat, another spring having a length greater than said first mentioned spring, one end of said second spring being secured to one of said thrust plates and the other end of said spring being arranged to pass through said opening in the other of said plates, a stop to which the protruding end of the spring is secured, said stop having a diameter greater than the diameter of the aforementioned opening, said inner element being adapted to bear against said first mentioned plates alternatively, to expand said springs alternatively in opposite directions.

3. In a shock absorbing device, a housing, said housing being formed to provide spaced abutments, thrust plates movable with respect to the housing and adapted to seat against said abutments, one of said plates having an opening, a primary coil spring of an extension type in said housing and secured at its ends to the respective plates, a secondary coil spring of a length greater than said first mentioned spring positioned in the housing and extending through said opening one end of the secondary spring being secured to one of said plates, a stop carried by end of said secondary spring and serving to limit the movements of said secondary spring in opposite direction, an actuating element in said housing adapted to bear against the inner sides of said plates alternatively serving to expand said springs at different periods in opposite directions.

4. In a shock absorbing device, a plurality of coil springs of a character described, spaced thrust plates the ends of one of said springs secured to said plates supporting means for said plates, another of said coil springs having a length greater than the first mentioned spring, one end of said other spring being secured to the protruding end of said last mentioned spring, an actuating element substantially as described within the housing and adapted to expand said springs at different periods by alternately lifting the plates from said supporting means, by the reciprocatory movement of said actuating element.

5. In a shock absorbing device, a housing, a plurality of coil springs of different length as described in said housing plates on the ends of said springs, means for supporting said plates in said housing substantially as described, an actuating element, adapted to connect said springs to an element of a vehicle, and means to connect the casing to another element of the vehicle, for the particular application of the principle as herein set forth.

6. In combination with a fixed element and a movable element, a double acting mechanism to absorb shock, embodying a plurality of coil springs, a pair of thrust plates, the ends of one of said springs being secured to said spaced thrust plates, spaced supports on which the plates alternately bear the other of said springs having a length greater than the first mentioned spring, being connected at one end to one of said plates and extending through an opening in the other plate, a stop attached to said extended end and adapted to abut against the adjacent plate, an actuating member adapted to bear against said plates alternatively, serving to expand said coil springs, said actuating member being attached to one of said elements and the spaced supports being fixed with respect to the other element.

7. In combination with a vehicle having relatively movable parts of a housing fastened to one of said parts, a sleeve in the housing and fastened to the other vehicle part, said sleeve having slots, spaced internal abutments in the housing, thrust plates adapted to co-operate with said abutments one of said plates having an opening, projections on the other plate which works through said slots, a primary coil spring between, and attached to said plates, a secondary coil spring attached at one end, to one plate and whose free end extends through the opening of the other plate, and a stop carried by said free end of said spring.

8. In combination with a vehicle having relatively movable parts, of a housing fastened to one part, spaced abutments in the housing, a thrust member connected to the other vehicle part and movable in said housing, thrust plates adapted to co-operate with said abutments, and one of which has an opening, a coil spring attached at its respective ends to said plates, said thrust member being adapted to alternatively lift said plates from said respective abutments as said thrust member reciprocates relative to the housing.

9. In combination with a vehicle having relatively movable parts, of a housing fastened to one part, spaced abutments in the housing, a thrust member connected to the other vehicle part and movable in said housing, thrust plates adapted to co-operate with said abutments, and one of which has an opening, a coil spring attached at its respective ends to said plates, said thrust member being adapted to alternatively lift said plates from said respective abutments as said thrust member reciprocates relative to the housing, another coil spring attached, at one end, to one of said plates and whose other end extends through the opening of the other plate, and a stop attached to said last named end of said spring and adapted to engage against the last named plate.

10. A shock absorbing device including a fluid tight housing, a plurality of coil springs within the housing, spaced thrust plates, each having an opening, the ends of one of said springs being secured to said plates, the other of said coil springs having a length greater than the first mentioned spring, one end of said other spring being secured to one of said thrust plates and its other end protruding through the opening of the other thrust plate, a stop carried by said protruding end and adapted to abut the adjacent thrust plate and an actuating element within the housing adapted to alternatively actuate said thrust plates and thereby expand said springs, said thrust plates, when actuated, being disposed to operate against the fluid in the housing to retard the expansion of said springs.

WALTER SWINDOWSKY.